United States Patent [19]
Werz et al.

[11] 3,790,263
[45] Feb. 5, 1974

[54] MOTION PICTURE CAMERA WITH FADING MEANS

[75] Inventors: Siegfried Werz, Munich; Johann Zanner, Jr., Unterhaching, both of Germany

[73] Assignee: AGFA-Gevaert Aktiengesellschaft, Leverkusen, Germany

[22] Filed: Mar. 28, 1972

[21] Appl. No.: 238,763

[30] Foreign Application Priority Data
Mar. 29, 1971 Germany............................ 2115207
Aug. 14, 1971 Germany............................ 2140813

[52] U.S. Cl. ................................................. 352/91
[51] Int. Cl. .......................................... G03b 21/36
[58] Field of Search ...................................... 352/91

[56] References Cited
UNITED STATES PATENTS
3,246,944  4/1966  Winkler ................................ 352/91
3,692,395  9/1972  Fida ..................................... 352/91
3,617,118  11/1971  Muller ................................. 352/91
3,690,748  9/1972  Roth ..................................... 352/91

Primary Examiner—Joseph F. Peters, Jr.
Assistant Examiner—Russell E. Adams, Jr.
Attorney, Agent, or Firm—Michael S. Striker

[57] ABSTRACT

A motion picture camera wherein the fading means is prepared for operation by a setting unit which can be actuated by hand to thereby change the condition of the fading means to a condition of readiness. The making of trick shots begins in response to return movement of the camera release element to its idle position; an adjusting device of the fading means is then operatively connected with the diaphragm so that the size of the light-admitting aperture of the diaphragm changes whereby the camera makes exposures with fade-out or fade-in effect, or first with fade-out and thereupon with fade-in effect.

23 Claims, 4 Drawing Figures

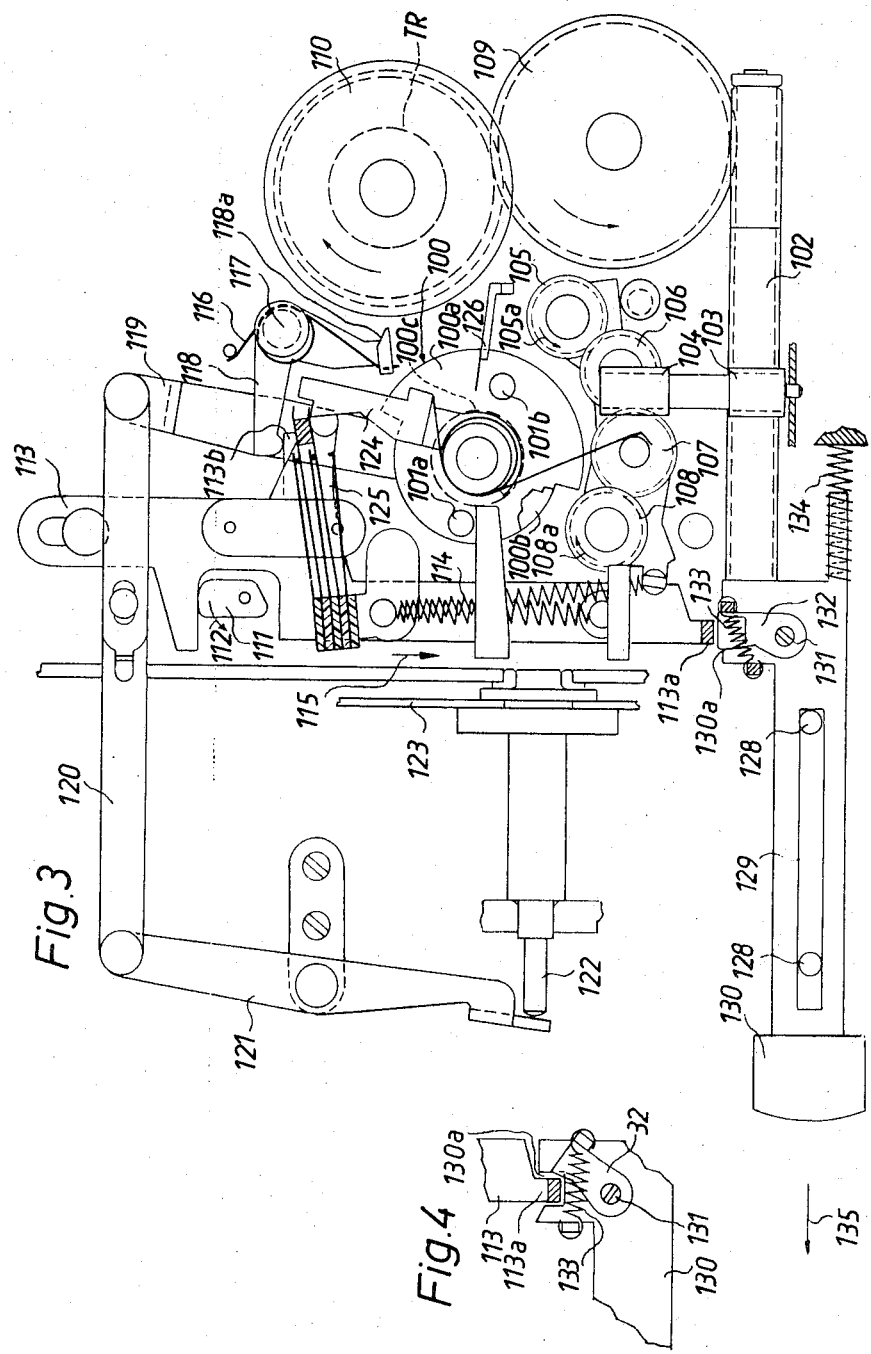

MOTION PICTURE CAMERA WITH FADING MEANS

BACKGROUND OF THE INVENTION

The present invention relates to cinematographic apparatus in general, and more particularly to improvements in motion picture cameras which are provided with fading means. Still more particularly, the invention relates to improvements in motion picture cameras wherein the fading means is preferably constructed and assembled in such a way that it can automatically complete a series of exposures with fade-in and/or fade-out effect once it is set in operation by the user of the camera.

A drawback of presently known motion picture cameras with fading means is that they must be provided with discrete operating means for the fading means. As a rule, the camera is provided with a switch, lever or a like operating device which must be actuated in order to initiate the making of trick shots known as exposures with fade-in and/or fade-out effect. Furthermore, the making of such trick shots begins in immediate response to actuation of the discrete operating element. In other words, the operating element must be actuated while the camera is in use, i.e., while the user of the camera maintains the customary release element in its operative position so that the camera makes normal exposures without fade-out or fade-in effect. This often leads to the so-called "tearing" or similar interruptions in smooth transition of images of successively exposed film frames. Also, an inexperienced photographer is much less likely to start the making of exposures with fade-out or fade-in effect at an optimum moment if the initiation of the making of such exposures involves the manipulation of a discrete part which is provided in addition to other parts or elements requiring attention during the making of exposures.

SUMMARY OF THE INVENTION

An object of the invention is to provide a motion picture camera which embodies simple or sophisticated fading means and wherein the making of exposures with the assistance of fading means can be initiated in a manner much simpler than in connection with heretofore known motion picture cameras having fading means.

Another object of the invention is to provide a motion picture camera which is constructed and assembled in such a way that the fading means can be prepared for operation prior to the making of any exposures or during the making of normal exposures.

A further object of the invention is to provide a motion picture camera wherein the fading means need not be provided with a discrete operating element which performs no other function but to initiate the making of exposures with fade-out or fade-in effect.

An additional object of the invention is to provide a motion picture camera wherein conventional fading means can be controlled by a novel and improved structure which renders it possible to set the fading means in operation at the exact moment when the user of the camera desires, without necessitating the actuation of any device or element other than that which must be provided and/or actuated anyway, i.e., regardless of whether the camera is or is not equipped with fading means.

Another object of the invention is to provide a novel method of preparing the fading means of a motion picture camera for operation either shortly prior to or long before the making of exposures with fade-in and/or fade-out effect so that the user can concentrate on the subject or scene at the time the making of trick shorts is being started or is in progress.

A further object of the invention is to provide a motion picture camera which is constructed and assembled in such a way that the making of exposures with fade-in and/or fade-out effect requires much less attention and/or concentration on the part of the user than in heretofore known cameras which are provided with automatic or semiautomatic fading means.

An ancillary object of the invention is to provide novel and improved fading means for use in motion picture cameras.

The invention resides in the provision of a motion picture camera which comprises an adjustable diaphragm having a light-admitting aperture of variable size, fading means including adjusting means which is operative to adjust the diaphragm to thereby make exposures with fade-out and/or fade-in effect, the fading means having a first condition of readiness and normally assuming a second condition, setting means which is actuatable (e.g., by hand) to change the condition of the fading means to the first condition of readiness, and operating means which is actuatable to start the operation of the adjusting means in the first condition of the fading means.

The camera further comprises drive means which includes at least one mobile driving member and preferably serves to operate the film transporting mechanism. The fading means further comprises a programming disk or an analogous driven member which engages with the driving member in response to actuation of the operating means in the first condition of the fading means whereby the driven member receives motion from the driving member and directly operates or initiates the operation of adjusting means. The driving member is preferably maintained in motion for an interval of time which is determined by the fading means and begins with the actuation of operating means; the means for maintaining the driving member in motion may form part of the fading means.

The operating means preferably includes the release element of the camera and the actuation of such operating means preferably involves a movement of the release element from its operative to its idle position in the first condition of the fading means.

The setting means may comprise a plurality of mechanical and/or current-consuming components.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagrammatic partly elevational and partly sectional view of a third motion picture camera with modified mechanical setting means for the fading means; and FIG. 4 illustrates a detail in the structure of FIG. 3 with a pawl on the release element and a projection of the input member of the setting means shown in different positions.

DESCRIPTION OF THE PREFERRED EMBODIMENTS

Figures 1, 2:
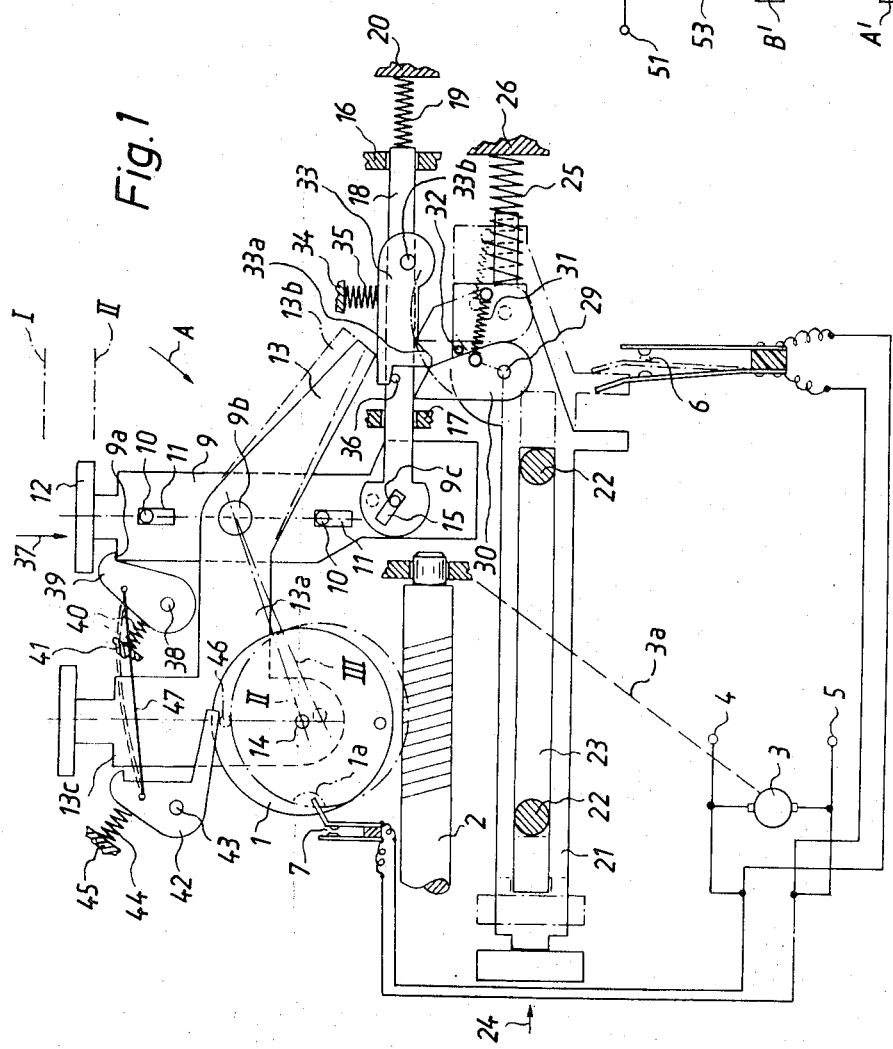
FIG. 1 is a fragmentary schematic partly elevational and partly sectional view of a motion picture camera with mechanical setting means for the fading means.
FIG. 2 is a diagram of a portion of a second motion picture camera wherein the fading and setting means employ current-consuming components.

Referring first to FIG. 1, there is shown a portion of a motion picture camera which embodies fading means of the type disclosed in German printed publication No. 1,949,891. The fading means comprises a rotary driven member here shown as a programming disk 1 which can be mounted in such a way that it completes one full revolution in order to effect the completion of a full fading operation including the making of a series of exposures with fade-out effect, a rearward transport of that length of motion picture film whose frames were exposed with fade-out effect, and the renewed exposure of such film frames but with fade-in effect. The motion picture camera further comprises a mechanical "make-ready" or setting unit A which can be actuated to prepare the diaphragm adjusting means of the fading means for operation which begins as soon as the user actuates an operating means of the camera; in the embodiment of FIG. 1, the operating means is the camera release element 21 and the actuation of operating means involves the termination of finger pressure upon the release element 21 so that the latter can move from an operative to an idle position. Thus, the setting unit A can prepare the fading means for operation of its diaphragm adjusting means, either prior to the making of any exposures or during the making of normal exposures, so that the fading means will be in a condition of readiness and its diaphragm adjusting means begins to operate at a moment which can be selected by the user to be best suited to start the making of trick shots.

The camera comprises a drive means which includes a reversible electric motor 3 serving to rotate a driving member here shown as a worm 2 which, in turn, can rotate the driven member or programming disk 1 when the parts of the setting unit A are moved from first to second positions (corresponding to the condition of readiness of the fading means) and when the user thereupon decides to permit the release element 21 to reassume its idle or inoperative position. The transmission which connects the worm 2 with the output member of the motor 3 is indicated by a broken line, as at 3a. The contacts 4,5 of the motor 3 are connected with a suitable source of electrical energy. The circuit of this motor comprises two normally open switches 6, 7 which are connected in parallel with each other and at least one of which must be closed in order to start the motor 3. The normally open switch 6 is closed by the release element 21 when the latter assumes its operative position, and the normally open switch 7 is closed by the programming disk 1 of the fading means when the release element 21 is allowed to assume its idle position while the fading means assumes the condition of readiness. The motor 3 drives the customary claw pull-down (not shown) of the film-transporting mechanism.

The setting unit A comprises a reciprocable input member or slide 9 which has a pair of aligned elongated slots 11 for fixed guide pins 10 mounted in the housing of the motion picture camera. The exposed end of the slide 9 is provided with a handgrip portion or knob 12 which can be depressed (arrow 37) by the user of the camera so as to move with the slide 9 from a first position I to a second position II. A median portion of the slide 9 is provided with a pivot pin 9b for a bell crank lever 13 of the fading means. The lever 13 has an arm 13a which carries a shaft 14 for the programming disk 1. The lower or inner end portion of the input member or slide 9 is provided with a motion-transmitting pin 9c which extends into an inclined slot 15 machined into a second slide 18 which is reciprocable in bearings 16, 17 provided therefor in the housing of the motion picture camera. A helical spring 19 which is attached to a portion 20 of the camera housing urges the slide 18 in a direction to the right, as viewed in FIG. 1. Thus, if the slide 9 does not offer an excessive resistance to upward movement to the first position I, the spring 19 is free to pull the slide 18 from the illustrated left-hand end position to a right-hand end position whereby the pin-and-slot connection 9c, 15 causes the slide 9 to move upwardly and to return with its knob 12 from the second position II to the first position I.

The release element 21 is provided with an elongated slot 23 for two spaced guide pins 22 which are mounted in the housing of the motion picture camera and determine the extent to which the release element can be moved between its idle position (shown by solid lines) and the operative position which is indicated by phantom lines. In order to move the release element 21 from the solid-line idle position, the user of the camera must exert finger pressure in the direction of arrow 24 so as to overcome the resistance of a helical spring 25 which reacts against a portion 26 of the camera housing. A pivot pin 29 on the release element 21 serves as a fulcrum for a pawl 30 which is biased in a clockwise direction, as viewed in FIG. 1, by a helical spring 31 so that it normally bears against an abutment or stop 32 on the release element 21. The pawl 30 can cooperate with a second pawl 33 which is pivotally mounted on the slide 18, as at 33b, and is biased in a counterclockwise direction by a helical spring 35 so that it normally bears against an abutment or stop 36 of the slide 18. The spring 35 reacts against a stationary portion 34 of the camera housing. The operation:

It is assumed that the user of the camera wishes or intends to make exposures with fade-out effect, i.e., to expose with such effect a predetermined number of last film frames of a series of film frames which record the images of a selected subject or scene. If the decision is made prior to making of the first normal exposure of such particular scene or subject, the user exerts finger pressure upon the knob 12 (arrow 37) so that the slide 9 moves against the opposition of the spring 19 to assume the illustrated second position whereby the pin-and-slot connection 9c, 15 causes the slide 18 to assume the illustrated left-hand end position. As the slide 9 reaches the illustrated second position, its shoulder 9a is engaged by the pallet of an arresting pawl 39 which is mounted in the camera housing on a pivot pin 38 and is biased clockwise by a helical spring 40. The latter reacts against a stationary portion 41 of the camera housing. Thus, the slide 9 is thereupon held by pawl 39 so that it remains in the illustrated second position II and the slide 18 is compelled to dwell in its left-hand end position.

As the slide 18 moves against the opposition of the spring 19, a cam face 33a on the pawl 33 moves into the path of movement of the tooth of the pawl 30. When the release element 21 is thereupon depressed (arrow 24) against the opposition of the spring 25 to close the switch 6 and to thereby start the motor 3, the tooth of the pawl 30 moves to the phantom-line position of FIG. 1 so that it is located to the right of the cam face 33a on the pawl 33. If desired, the pawl 30 can be replaced by a rigid projection on the release element 21.

The camera begins to make normal exposures as soon as the release element 21 is depressed against the opposition of the spring 25, i.e., as soon as the switch 6 is closed to start the motor 3 in a forward direction. The claw pull-down then transports the motion picture film stepwise in a manner well known from the art of motion picture cameras. When the user decides that the camera should start the making of exposures with fade-out effect, the pressure upon the release element 21 is relaxed so that the element 21 moves back toward the solid-line idle position of FIG. 1. During such movement of the release element 21, the tip or tooth of the pawl 30 (which bears against the stop 32 of the release element 21 under the action of the spring 31) engages the cam face 33a and pivots the pawl 33 in a clockwise direction so that the pawl 33 engages the right-hand arm 13b of the bell crank lever 13 and pivots the lever 13 on the pin 9b of the slide 9. The resulting position of the arm 13b is indicated in FIG. 1 by phantom lines. The arm 13a of the bell crank lever 13 then moves a worm wheel (not specifically shown) of the programming disk 1 into mesh with the worm 2 which is rotated by the motor 3. Thus, the disk 1 begins to rotate and thereby causes a suitable adjusting mechanism of the fading means to gradually reduce the size of the aperture furnished by the diaphragm (not shown in FIG. 1 but see 123 in FIG. 3) so that the camera makes exposures with fade-out effect. The manner in which the disk 1 operates the adjusting means for the diaphragm to reduce the size of the light-admitting aperture is disclosed in the aforementioned German printed publication No. 1,949,891 and is not specifically shown in FIG. 1. It will be noted that the right-hand contact of the normally-open switch 7 in the circuit of the motor 3 extends into a notch or recess 1a in the periphery of the programming disk 1 (when the disk 1 is disengaged from the worm 2). When the bell crank lever 13 is pivoted by the pawl 33, the right-hand contact of the switch 7 is expelled from the notch 1a so that the switch 7 closes not later than at the time when the release element 21 allows the switch 6 to open. Thus, the circuit of the motor 3 remains completed in spite of the fact that the release element 21 returns to its idle position and allows the switch 6 to open.

The raised position of the shaft 14 (corresponding to the condition of readiness of the fading means including the programming disk 1) is indicated at II, and the lowered position of this shaft is shown at III. The shaft 14 is caused to move to the position III in response to movement of the release element 21 to its idle position in the second position II of the slide 9. When the disk 1 dwells in the solid-line (disengaged) position of FIG. 1, it maintains an arresting lever 42 in an inoperative position. However, when the lever 13 causes the disk 1 to move to the engaged (phantom-line) position of FIG. 1, the disk 1 allows a helical spring 44 to pivot the arresting lever 42 in a clockwise direction, as viewed in FIG. 1, so that a tooth on the upper arm of the lever 42 engages and holds a shoulder 13c on the left-hand arm 13a of the lever 13. Thus, the lever 13 is compelled to remain in its operative position, corresponding to the condition of readiness of the fading means, and thereby maintains the disk 1 in engagement with the worm 2. The spring 44 reacts against a stationary portion 45 of the camera housing. The pivot pin for the blocking lever 42 is shown at 43. As mentioned above, the disk 1 can be rotated by the worm 2 through a full revolution (it is assumed that the worm 2 rotates the disk in a clockwise direction, as viewed in FIG. 1). During such rotation of the disk, the camera will make only a series of exposures with fade-out effect or it can carry out a complete fading operation, namely, a series of exposures with fade-out effect followed by a rearward transport of that length of motion picture film whose frames were exposed with fade-out effect, and finally a series of exposures with fade-in effect so that each frame of the just mentioned length of motion picture film is exposed twice, first with fade-out effect and thereupon with fade-in effect. This depends on the construction of the fading means which includes the programming disk 1.

When the fading operation is completed, the camera is automatically readjusted or reset for the making of normal exposures, i.e., for the making of exposures without fade-out or fade-in effect. To this end, the programming disk 1 carries a restoring pin or stud 46 which engages and pivots the lower arm of the arresting lever 42 when the disk 1 completes a full revolution. The tooth of the lever 46 is then disengaged from the shoulder 13c of the bell crank lever 13, and an elastic coupling member 47 (e.g., a piece of elastic wire which connects the arresting lever 42 with the arresting pawl 39) then causes the pallet of the pawl 39 to release the shoulder 9a so that the slides 9 and 18 can reassume their normal or first positions under the action of the spring 19. A further spring (not shown) moves the lever 13 to the solid-line position of FIG. 1 as soon as the shoulder 13c is disengaged from the blocking lever 42 so that the programming disk 1 is moved to the solid-line position of FIG. 1 and is disengaged from the worm 2.

If the fading means is designed to carry out a complete fading operation, the making of exposures with fade-out effect is completed while the disk 1 rotates through 360°. As the disk 1 becomes disengaged from the worm 2, it automatically closes one or more switches (not shown) which reverse the direction of rotation of the motor 3 so that the motor 3 transports rearwardly that length of film which was exposed with fade-out effect. Such length of film can be loosely looped in a cassette for motion picture film wherein the takeup reel can rotate in a single direction, namely, in a direction to collect the film. If the cassette employs a takeup reel which can rotate in two directions, the motor 3 drives the takeup reel in a direction to pay out the film while the claw pull-down transports rearwardly that length of film which was exposed with fade-out effect. When the user thereupon depresses the release element 21, a suitable mechanism (not shown) automatically causes the adjusting means for the diaphragm to gradually increase the size of the light-admitting aperture so that the camera reexposes those film frames which were exposed with fade-out effect but the second exposure of such frames to scene light is carried out with fade-in effect. Once the diaphragm is fully open, the camera begins to make normal exposures whereby the size of the aperture is preferably determined by a suitable exposure control as a function of scene brightness, i.e., the diaphragm is then disconnected from the adjusting means of the fading means and is operatively connected with the exposure control which includes one or more photosensitive elements and means for varying the aperture size in dependency on changes in the intensity of scene light.

It will be noted that the mechanical setting unit A has an input structure (including the slide 9) which is movable by hand from a first position I to a second position II to thereby change the condition of the fading means to a condition of readiness. The diaphragm adjusting means of the fading means is operated in automatic response to movement of the release element 21 to its idle position provided, of course, that the setting unit A has been actuated so that its input member 9 dwells in the second position which corresponds to the (first) condition of readiness of the fading means. If the release element 21 is allowed to reassume its idle position while the slide 9 dwells in the position I, the switch 6 simply opens and the motor 3 is arrested to interrupt the making of normal exposures.

The resetting stud 46 can be called a time delay device which automatically disengages the worm wheel of the programming disk 1 from the driving member or worm 2 with a predetermined delay following the movement of release element 21 to its idle position. Such delay is selected with a view to insure that the camera completes the making of exposures with fade-out and/or fade-in effect before the arresting lever 42 is disengaged from the bell crank lever 13 so that the fading means can assume a second condition corresponding to the first position I of the slide 9. In the embodiment of FIG. 1, the restoring or time delay means (stud 46) forms part of the fading means. The coupling member 47 insures that the return movement of slide 9 to the first position I takes place substantially simultaneously with disengagement of the arresting lever 42 from the bell crank lever 13, i.e., that the change in the condition of the fading means from a condition of readiness to a second condition occurs simultaneously with reassumption by the setting unit A of its inoperative position.

An important advantage of the improved motion picture camera is that it enables the user to change the condition of the fading means to a condition of readiness prior to the making of normal exposures which are to be followed by a series of trick shots or during the making of such normal exposures. In conventional motion picture cameras, the making of trick shots (including the exposures with fade-out or fade-in effect) must be started by actuation of a discrete member which is expressly provided for such purposes and which does not constitute the release element of the camera. In the camera of FIG. 1, the user must press the release element 21 anyway, while the camera makes normal exposures, so that the relaxation of finger pressure upon the release element 21 in order to initiate the making of exposures with fade-out or fade- in effect requires much less attention than the actuation of a discrete member which is employed in conventional cameras. If the fading means is of the type which automatically reverses the direction of film transport upon completion of a series of exposures with fade-out effect, the programming disk 1 preferably arrests the motor 3 when the claw pull-down has completed the rearward transport of those film frames which were exposed with fade-out effect. In order to thereupon reexpose such film frames with fade-in effect, the user merely depresses the release element 21 so that the motor 3 is started in a forward direction and the fading means causes its diaphragm adjusting means (analogous to the parts 119–122 shown in FIG. 3) to gradually increase the size of the light-admitting aperture so that the camera makes exposures with fade-in effect. The making of such exposures is followed by the making of normal exposures as soon as the size of the aperture is increased to its maximum value. The adjusting means of the fading means is then disengaged from the diaphragm and the latter is thereupon regulated by the automatic exposure control as a function of scene brightness.

FIG. 2 illustrates a portion of a second motion picture camera wherein the mechanical setting unit A of FIG. 1 is replaced with an electrically operated setting unit B having current-consuming components. The second camera comprises drive means including a motor 50 which has an output shaft or driving member 50a serving to drive the claw pull-down. The motor contacts 51, 52 are connected with a suitable energy source, not shown. The motor 50 is connected in parallel with two relays A', B' which are connected in series with each other and with a release element 53 in the form of a normally open electric switch. When the relay A' is energized, it closes a relay switch a1 to thereby complete the circuit of the motor 50. The relay A' further comprises a holding contact or switch a2 which is also closed in response to energization of this relay.

The motor 50 is connected in parallel with an electronic or electric motor operated circuit 54 forming part of the fading means and constituting a means for adjusting the diaphragm in the motion picture camera. This circuit 54 can gradually close the diaphragm during fade-out to thereupon maintain the diaphragm in closed position during rearward transport of that length of film whose frames were exposed with fade-out effect, and to finally gradually open the diaphragm to reexpose with fade-in effect those film frames which were previously exposed with fade-out effect. Such circuits are known in the art of motion picture cameras. A manually operable switch 55a of the setting unit B can be closed by the user of the camera if the user intends to make exposures with fade-out effect at the end of the filming of a particular subject or scene. The closing of the normally open switch 55 prepares the fading means including the adjusting circuit 54 for operation; such operation will begin as soon as the user allows the previously closed release element or switch 53 to open. The switch 55a is mechanically connected with a second switch 55b which is in series with the holding contact a2 of the relay A'. The circuit of the relay A' will remain completed if the user closes the switches 55a, 55b and thereupon allows the release element or switch 53 to open.

The operation of the structure shown in FIG. 2 is as follows:

The camera will make normal exposures (without fade-out or fade-in effect) in response to closing of the release switch 53. Such closing results in energization of the relays A', B' whereby the relay A' closes its contacts a1 and a2. The contact a1 completes the circuit of the motor 50 so that the latter operates the claw pull-down of the film-transporting mechanism. It is assumed that the switches 55a and 55b of the setting unit B are open; therefore, the adjusting circuit 54 for the diaphragm of the motion picture camera is inoperative and the size of the aperture furnished by the diaphragm is regulated only by the customary exposure control (not shown) as a function of scene brightness.

The closing of the holding contact a2 in response to energization of the relay A' has no immediate effect on the operation of the camera because the switch 55b is open. If the user intends to make exposures with fade-out effect, the switches 55a, 55b are closed, either prior to or during the making of normal exposures. As soon as the switch 55a closes, the adjusting circuit 54 for the diaphragm is prepared for operation but is still idle as long as the release switch 53 remains closed. A switch or contact b of the relay B' is closed when this relay is deenergized and is open when the relay B' is energized. Since the relay B' is energized in response to closing of the release switch 53, the contact b (which is in series with the circuit 54 and switch 55a) is open so that the circuit 54 is inoperative as long as the relay B' remains energized.

When the motor 50 is running in response to closing of the release switch 53, the camera makes normal exposures because the energized relay B' maintains its contact b in open position. If the user decides that the camera should make exposures with fade-out effect, the switch 53 is allowed to open (while the switches 55a, 55b are closed) so that the relay B' is deenergized and the contact b closes to complete the adjusting circuit 54. The circuit of the motor 50 remains completed by way of the switch a1 because the relay A' remains energized by way of the switch 55b and holding contact a2. The output shaft 50a of the motor 50 causes the adjusting circuit 54 to gradually reduce the aperture size of the diaphragm so that the camera makes exposures with fade-out effect while the release switch 53 dwells in its open or idle position. The circuit 54 includes a suitable timer mechanism serving to determine the number of film frames which are exposed with fade-out effect. When the diaphragm is closed in response to completion of a predetermined number of exposures with fade-out effect, the circuit 54 (or the diaphragm) reverses the direction of rotation of the motor 50 so that the claw pull-down of the film-transporting mechanism transports rearwardly that length of motion picture film which was exposed with fade-out effect. If the circuit 54 is designed to merely effect the making of exposures with fade-out effect, the relay switch a1 is opened in automatic response to completion of such exposures so that the motor 50 is arrested and remains idle until the user decides to again close the release switch 53. If the circuit 54 is to cause the camera to make a series of exposures first with fade-out and thereupon with fade-in effect, the relay switch a1 is opened in automatic response to completion of rearward transport of those film frames which were exposed with fade-in effect. If the switches 55a, 55b of the setting unit B remain closed after the rearward transport of once-exposed film frames is completed, a renewed closing of the release switch 53 will cause the camera to make exposures with fade-in effect and thereupon normal exposures. The making of exposures with fade-in effect is completed when the camera exposes for the second time (but with fade-in effect) those film frames which were previously exposed with fade-out effect. The circuit 54 or the diaphragm opens the switches 55a, 55b in response to completion of exposures with fade-in effect so that the camera then proceeds with the making of normal exposures as long as the release switch 53 remains in closed position. The opening of the switches 55a, 55b can be effected by a rotary restoring cam 56 which is driven by the diaphragm adjusting circuit 54 and has a lobe or the like which acts upon the mechanical connection between the switches 55a, 55b to open these switches when the making of exposures with fade-in effect is completed. The cam 56 can further serve to open the relay contact a1 upon completed rearward transport of those film frames which were exposed with fade-out effect.

It will be seen that the camera which embodies the structure of FIG. 2 is clearly analogous to the camera of FIG. 1. The switches 55a, 55b constitute the input means of the setting unit B and are actuatable by hand to move from first or open positions to second or closed positions whereby the condition of the fading means including the diaphragm adjusting circuit 54 is changed to a condition of readiness. The diaphragm adjusting circuit 54 is set in operation (in closed or second positions of the switches 55a, 55b) in response to movement of the release switch 53 from its operative or closed position to its idle or open position.

The switch 55b of the setting unit B cooperates with the holding contact a2 to maintain the contact a1 in closed position (by insuring that the circuit of the relay A' remains completed) when the release switch 53 is caused or allowed to open in the closed positions of switches 55a, 55b. However, such opening of the release switch 53 results in deenergization of the relay B' so that the switch b closes and cooperates with the switch 55a to complete the diaphragm adjusting circuit 54 whereby the camera begins to make exposures with fade-out or fade-in effect, depending on the nature of the fading means which embodies the circuit 54. The cam 56 is analogous to the restoring stud 46 on the programming disk 1 of FIG. 1, i.e., it can cause the switches 55a, 55b of the setting unit B to move to their first or open positions with a predetermined delay following the movement of release switch 53 to its open position in the closed positions of switches 55a, 55b. The setting unit B includes the switches 55a, 55b and the relays A', B' with their contacts or switches a1, a2 and b.

FIG. 3 illustrates a portion of a motion picture camera which embodies fading means of the type disclosed in German printed publication No. 2,037,815. The camera comprises an adjustable diaphragm 123 defining an aperture of variable size and being adjustable by a link train 119, 120, 121 and a rod 122 of the fading means. The latter further comprises a rotary programming disk 100 which includes two coaxial gears or wheels 100a, 100b and a one-way clutch 100c between the gears 100a, 100b. The disk 100 constitutes the driven member of the fading means and can receive motion from a drive which operates the claw pull-down (not shown) of the film-transporting mechanism and includes a driving member or worm 102. The drive means further comprises a transmission 103, 104 which receives torque from the driving member 102, and a gear train including a set of mating gears 105, 106, 107, 108. The driving member 102 further serves to rotate a gear 110 for the takeup reel TR in a cassette (not shown) for motion picture film. The gear 110 receives torque from an intermediate gear 109. The cassette which includes the takeup reel TR is assumed to be of the type wherein the takeup reel can rotate in a single direction, namely, in a direction to collect the film. Therefore, if the camera is to make exposures with fade-out and fade-in effect so that the exposures with fade-in effect are superimposed upon exposures with fade-out effect, the takeup reel TR must be arrested during the making of exposures with fade-out effect. This will be readily understood since that length of motion picture film whose frames were exposed with fade-out effect must be transported rearwardly prior to renewed exposure to scene light but with fade-in effect.

The setting unit of the camera shown in FIG. 3 comprises an input member or lever 113 which is movable from a first position (shown in FIG. 3) to a second or intermediate position (not shown) and thereupon to a third position which is shown in FIG. 4. The means for actuating the input lever 113 comprises a helical spring 114 which urges the lever downwardly, as viewed in FIG. 3, and a turnable actuating member or wiper 111 which is accessible to the hand of the user of the camera and is analogous to the knob 12 of FIG. 1. When the user decides to rotate the wiper 111 through 90° in the direction indicated by arrow 112, the lever 113 is caused by the spring 114 to leave its first position and to assume its second position in which a projection or arm 113a of the lever is normally held by a blocking pawl 132 on a reciprocable release element 130 of the motion picture camera. The direction in which the spring 114 moves the lever 113 in response to counterclockwise rotation of the wiper 111 is indicated by the arrow 115.

In the absence of the projection or arm 113a on the lever 113, the fading means of the camera shown in FIG. 3 operates as follows:

The camera makes normal exposures in response to depression of the release element 130 against the opposition of a helical spring 134. The release element 130 then completes the circuit of an electric motor (not shown) which forms part of the drive means and rotates the worm 102 to thereby rotate the takeup reel TR in a direction to collect the film. When the user wishes to start the making of exposures with fade-out effect, the wiper 111 is turned in the direction indicated by arrow 112 so that the spring 114 compels the lever 113 to move (arrow 115) all the way to the aforementioned third or lower end position (it being assumed that the projection 113a does not exist so that the release element 130 does not interfere with movement of the lever 113 to such lower end position). A shoulder 113b of the lever 113 thereby pivots a pawl 118 which is mounted in the camera housing on a pivot pin 117 and is biased counterclockwise, as viewed in FIG. 3, by a torsion spring 116. The pallet 118a of the pawl 118 engages the adjacent tooth of the gear 110 to thereby prevent further rotation of the takeup reel TR in a direction to collect motion picture film while the camera makes exposures with fade-out effect.

Then the lever 113 assumes its lower end position, the front gear or wheel 100a of the programming disk 100 moves into mesh with the gear 105 which is driven by the worm 102 to rotate in the direction indicated by arrow 105a. The gear 100a begins to rotate in a clockwise direction, as viewed in FIG. 3, and the clutch 100c entrains the rear gear 100b which also rotates clockwise and causes the adjusting means including the link train 119-121 and rod 122 to gradually reduce the size of the aperture which is defined by the diaphragm 123 so that the camera makes exposures with fade-out effect. As explained above, such exposures are being made while the pallet 118a holds the gear 110 against rotation in a direction to allow the takeup reel TR to collect the film. The making of exposures with fade-out effect is terminated when the front gear 100a of the programming disk 100 completes an angular movement of about 90°. A pin-shaped trip 101a on the front gear 100a then displaces a carrier 124 for a battery of switches 125 which reverse the direction of rotation of the motor for the worm 102. The latter rotates the gear 108 in the direction indicated by arrow 108a whereby the gear 108 rotates the gear 100a in a counterclockwise direction, as viewed in FIG. 3, while the clutch 100c allows the rear gear 100b of the disk 100 to remain at a standstill. Since the gear 100b controls the link 119 of the adjusting means for the diaphragm 123, the aperture size remains zero while the motor of the motion picture camera transports rearwardly that length of motion picture film whose frames were exposed with fade-out effect. The camera motor is arrested when the front gear 100a reassumes the illustrated position because a trip 101b on the gear 100a then opens a master switch 126 in the motor circuit. Thus, the motor is arrested upon completion of a series of exposures with fade-out effect and upon completed rearward transport of those film frames which were exposed with fade-out effect. The configuration of a cam on the gear 100b may be such that the camera makes exposures with fade-in effect when the motor is started again in response to depression of the release element 130. The gear 108 then rotates in a counterclockwise direction and drives the gear 100a in a clockwise direction so that the clutch 100c again rotates the gear 100b whereby the latter causes the adjusting means 119-122 to gradually increase the size of the aperture which is defined by the diaphragm 123 (e.g., an iris diaphragm) in order to insure that the exposures are made with fade-in effect. When the making of such exposures is completed, the gear 108 is disengaged from the gear 100a and the adjusting means 119-122 becomes ineffective so that the diaphragm 123 cam be adjusted by the customary exposure control as a function of scene brightness. The user rotates the wiper 111 back to the position shown in FIG. 3 so that the pallet 118a of the pawl 118 is disengaged from the gear 110 before the making of exposures with fade-in effect is started so that the film frames which are exposed with such effect (and which were previously exposed with fade-out effect) can be collected by the takeup reel TR. The gear 110 may comprise two sets of teeth one of which meshes with the teeth of the gear 109 and the other of which cooperates with the pawl 118. The two sets of teeth normally rotate as a unit due to the provision of a suitable friction clutch which, however, allows the gear 109 to rotate while the takup reel TR is at a standstill.

The heretofore described parts of the camera shown in FIG. 3 operate in a manner as disclosed in the German publication No. 2,037,814.

The lever 113 constitutes the input member of a setting means for the fading means of FIG. 3 (such setting means further includes the wiper 111) because the lever 113 is provided with the aforementioned projection or arm 113a which enables the lever to assume a second or intermediate position when the wiper 111 is rotated through 90° (arrow 112) prior to the making of normal exposures (which are to be followed by exposures with fade-out effect) or during the making of such normal exposures. When the lever 113 assumes its second position (in which the arm 113a abuts against the blocking pawl 132 on the release element 130, the fading means of the camera shown in FIG. 3 assumes a condition of readiness and the adjusting means 119–122 for the diaphragm 123 can be set in operation in response to movement of the release element 130 (arrow 135) from an operative or depressed position to the illustrated extended or idle position. The release element 130 has an elongated slot 129 for two fixedly mounted guide pins 128 which determine the extent of movement of the release element between its idle and operative positions. The blocking pawl 132 is mounted on a pivot pin 131 of the release element 130 and is biased by a helical spring 133 which tends to maintain it in a first or blocking position shown in FIG. 3. In such position, the blocking pawl 132 overlaps a recess or notch 130a of the release element 130.

When the user intends to make exposures with fade-out effect subsequent to the making of a series of normal exposures, the wiper 111 is moved to its other position while the camera motor is idle or while the camera makes normal exposures in response to depression of the release element 130 against the opposition of the spring 134. The spring 114 is then free to contract and to move the lever 113 downwardly until the lower end face of the arm 113a reaches and abuts against the top face of the blocking pawl 132. This arrests the lever 113 in the aforementioned second or intermediate position. When the user thereupon decides to start the making of exposures with fade-out effect, the pressure upon the release element 130 is relaxed so that the spring 134 is free to expand and pushes the element 130 in the direction indicated by the arrow 135, i.e., back to the idle position shown in FIG. 3. The righthand edge face of the arm 113a then engages one side face of the pawl 132 and pivots the latter to a second position, shown in FIG. 4, so that the notch 130a is exposed and permits entry of the arm 133a under the action of the spring 114. Thus, the lever 113 is free to assume its third position and the fading means causes its diaphragm adjusting means 119–122 to begin with adjustment of the diaphragm 123 in a manner as described above.

The blocking pawl 132 serves as a means for preventing the movement of the lever 113 to its third position when the release element 130 is held in its operative or depressed position as well as during movement of the release element 130 from the idle to operative position. Thus, the making of exposures with fade-out effect cannot begin in immediate response to depression of the release element 130; it is necessary to first depress the element 130 and to thereupon relax the finger pressure so that the spring 132 is free to expand while the arm 113a bears against the release element 130 under the action of the spring 114. Only then is the arm 113a in a position to pivot the blocking pawl 132 to the position of FIG. 4 and to penetrate into the notch 130a to thus initiate the operation of the diaphragm adjusting means 119–122. The arm 113a remains in the notch 130a during the making of exposures with fade-out effect as well as during the next-following rearward transport of that length of motion picture film whose frames were exposed with fade-out effect. The camera motor is arrested by the trip 101b and switch 126 when the rearward transport of once-exposed film frames (with fade-out effect) is completed. The pallet 118a of the pawl 118 can engage the gear 110 only when the arm 113a extends into the notch 130a of the release element 130. To thereupon begin the making of exposures with fade-in effect, the user must turn the wiper 111 back to the position shown in FIG. 3 so that the arm 113a is withdrawn from the notch 130a and the lever 113 returns to its first position. This disengages the pawl 118 from the gear 110 and the release element 130 is again depressible against the opposition of the spring 134 to start the camera motor in a forward direction whereby the adjusting means 119–122 causes the diaphragm 123 to gradually increase the size of its light-admitting aperture so that the camera makes exposures with fade-in effect. The making of such exposures is followed by the making of normal exposures if the release element 130 remains in its operative position after the completion of last exposure with fade-in effect.

An important advantage of the setting means shown in FIG. 3 is that it can be incorporated at a minimal cost in known camera types which are equipped with fading means. Thus, all that is necessary to convert the camera of the German publication No. 2,037,814 is to provide the lever 113 with the arm 113a, to modify the construction of the release element 130, and to provide such release element with a blocking pawl for the arm 113a.

It is clear that the fading means of FIG. 3 can be replaced by other types of fading means without departing from the spirit of the invention. For example, the camera of FIG. 3 may embody simpler fading means which is designed to make only exposures with fade-out or only exposures with fade-in effect. It is also clear that the camera of FIG. 1 or 3 may be equipped with electrical or electronic setting means for the fading means and/or with fading means which employs one or more current-consuming components. Analogously, the camera which embodies the structure of FIG. 2 can be provided with purely mechanical fading means.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising film transporting means; an adjustable diaphragm having a light-admitting aperture of variable size; fading means including adjusting means operative to adjust said diaphragm to thereby make exposures with fade-out and/or fade-in effect, said fading means having a portion adapted to assume a first condition of readiness and normally assuming a second condition; setting means actuatable to change the condition of said portion of said fading means to said first condition; and operating means for said film transporting means movable only between a first and a second position, said operating means being movable to said first position in either condition of said portion of said fading means to thereby start said film transporting means and said operating means being movable from said first position to said second position in which said operating means initiates the operation of said adjusting means only if said portion of said fading means is in first condition thereof.

2. A combination as defined in claim 1, further comprising drive means including at least one mobile driving member, said fading means further comprising at least one driven member which engages with said driving member in response to movement of said operating means to said second position in said first condition of said portion of said fading means.

3. A combination as defined in claim 2, further comprising means for maintaining said driving member in motion for an interval of time determined by said fading means and beginning with the movement of said operating means to said second position.

4. A combination as defined in claim 3, wherein said means for maintaining said driving member in motion forms part of said fading means.

5. A combination as defined in claim 1, wherein said setting means comprises a plurality of mechanical components.

6. A combination as defined in claim 5, wherein said components include an input member movable from a first to a second position to thereby change the condition of said portion of said fading means to said first condition, said operating means comprising a camera release element which is movable between idle and operative positions and said movement of said operating means to said second positions including the movement of said release element to said idle position whereby said release element initiates the operation of said adjusting means.

7. A combination as defined in claim 6, further comprising at least one rotary driving member, said fading means further comprising at least one rotary driven member which operates said adjusting means while receiving motion from said driving member in response to movement of said release element from said operative position to said idle position in the second position of said input member.

8. A combination as defined in claim 7, wherein said input member comprises an exposed portion which is manipulable by hand to move said input member from said first to said second position thereof.

9. A combination as defined in claim 7, wherein said fading means further comprises restoring means for returning said input member to said first position to thereby change the condition of said portion of said fading means to said second condition with a predetermined delay following the movement of said operating means to said second position.

10. A combination as defined in claim 7, further comprising arresting means for releasably holding said input member in said second position and means for disengaging said arresting means from said input member so that the latter is free to reassume said first position with attendant change in the condition of said portion of said fading means to said second condition with a predetermined delay following the momement of said operating means to said second position.

11. A combination as defined in claim 7, further comprising arresting means for releasably maintaining said portion of said fading means in said first condition in response to movement of said input member to said second position, and means for disengaging said arresting means from said fading means to thereby allow said portion of said fading means to assume said second condition with a predetermined delay following the actuation of said operating means to said second position.

12. A combination as defined in claim 11, further comprising second arresting means for releasably holding said input member in said second position and coupling means connecting said first mentioned and said second arresting means and arranged to disengage said second arresting means from said input member so that the latter is free to reassume said first position thereof in response to disengagement of said first mentioned arresting means from said fading means.

13. A combination as defined in claim 1, wherein said fading means and said setting means comprise current-consuming components.

14. A combination as defined in claim 13, wherein said adjusting means comprises an electric circuit and said setting means comprises switch means actuatable to partially complete said circuit so that said portion of said fading means then assumes said first condition.

15. A combination as defined in claim 14, wherein said operating means comprises a release element which is movable between idle and operative positions and said movement of said operating means to said second position includes the movement of said release element to said idle position in the actuated position of said switch means, said setting means further comprising second switch means arranged to complete said circuit and to thus effect the operation of said adjusting means in response to movement of said release element to said idle position in the actuated position of said first mentioned switch means.

16. A combination as defined in claim 15, further comprising an electric camera motor, said setting means further comprising third switch means for completing the circuit of said camera motor in the idle position of said release element and in the actuated position of said first mentioned switch means.

17. A combination as defined in claim 16, wherein said setting means further comprises a relay which is energized in response to movement of said release element to said operative position, said third switch means including the holding contact for said relay and said first mentioned switch means comprising two switches one of which is in series with said second switch means and the other of which is in series with said holding contact.

18. A combination as defined in claim 17, wherein said release element is an electric switch which is respectively open and closed in said idle and operative positions thereof, said holding contact and said other switch being connected in parallel with said release element.

19. A combination as defined in claim 14, wherein said circuit comprises restoring means for returning said switch means to an open position with a predetermined delay following the movement of said operating means to said second position and for thereby changing the condition of said portion of said fading means to said second condition.

20. A combination as defined in claim 1, wherein said setting means comprises an input member which is movable from a first to a second position to thereby change the condition of said portion of said fading means to said first condition, said operating means comprising a camera release element which is movable between an idle and an operative position and said movement of said operating means to said second position including the movement of said release element to said idle position, said release element comprising means for effecting the movement of said input member from said second to a third position to thereby initiate the operation of said adjusting means in response to movement of said release element to said idle position in the second position of said input member.

21. A combination as defined in claim 20, wherein said input member is a lever which comprises a portion normally held by said release element against movement of said lever to said third position and being free to permit such movement of said lever to said third position in response to movement of said release element to said idle position in the second position of said lever.

22. A combination as defined in claim 21, wherein said release element has a recess and further comprising a blocking member movably mounted on said release element and normally assuming a first position in which said portion is held against entry into said recess, said portion being arranged to move said blocking member to a second position in response to movement of said release element to said idle position in the second position of said lever whereby said lever is free to assume said third position as a result of penetration of said portion into said recess.

23. A combination as defined in claim 20, wherein said adjusting means comprises a link train and said fading means further comprises a driven programming device which is set in motion in response to movement of said operating means to said second position to thereby adjust said diaphragm by way of said link train.

* * * * *